United States Patent [19]

Konaka

[11] Patent Number: 4,507,168

[45] Date of Patent: Mar. 26, 1985

[54] METHOD FOR MOUNTING A FAUCET ON A PAPER CONTAINER AND APPARATUS THEREFOR

[75] Inventor: Yukio Konaka, Kanazawa, Japan

[73] Assignee: Shibuya Kogyo Co., Ltd., Kanazawa, Japan

[21] Appl. No.: 440,216

[22] PCT Filed: Feb. 27, 1981

[86] PCT No.: PCT/JP81/00038

§ 371 Date: Oct. 25, 1982

§ 102(e) Date: Oct. 25, 1982

[87] PCT Pub. No.: WO82/02852

PCT Pub. Date: Sep. 2, 1982

[51] Int. Cl.³ .............. B27G 11/02; B32B 31/24
[52] U.S. Cl. .............. 156/379.8; 156/273.3;
156/309.9; 156/320; 156/322; 156/324.4;
156/380.9; 156/499; 156/567; 493/87; 493/133
[58] Field of Search .............. 156/309.9, 322, 320,
156/324.4, 273.3, 499, 379.8, 567, 380.9;
428/35; 229/3.1; 493/87, 133

[56] References Cited

U.S. PATENT DOCUMENTS

| | | | |
|---|---|---|---|
| 2,972,184 | 2/1961 | Andrew | 493/87 |
| 3,498,868 | 3/1970 | Saumsiegle | 156/309.9 |
| 3,883,369 | 5/1975 | Badger et al. | 156/379.8 |
| 4,094,725 | 6/1978 | Takeda et al. | 156/499 |

FOREIGN PATENT DOCUMENTS 1322185 7/1973 United Kingdom .............. 493/87

Primary Examiner—John J. Gallagher
Attorney, Agent, or Firm—Flynn, Thiel, Boutell & Tanis

[57] ABSTRACT

The present invention relates to a method for mounting a faucet on a paper container which is used as a container for milk or the like. That is, the method comprises the steps of heating the adhesive portions of the paper container coated with a thermoplastic resin and the faucet made of a synthetic resin, and pressing both the adhesive portions against each other in the heated condition to cause them to adhere to each other. An apparatus for carrying out this method is provided with retaining mechanisms which hold the paper container and the faucet, respectively, and a heater for heating the paper container and the faucet that are held in the respective mechanisms, whereby, after the heating by the heater, the paper container and the faucet are caused to approach together and are pressed against each other.

7 Claims, 23 Drawing Figures

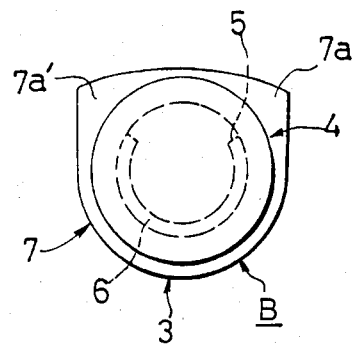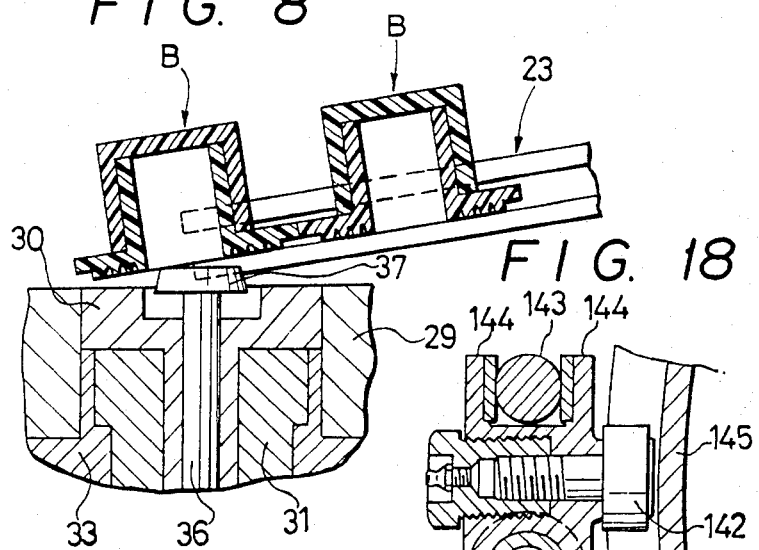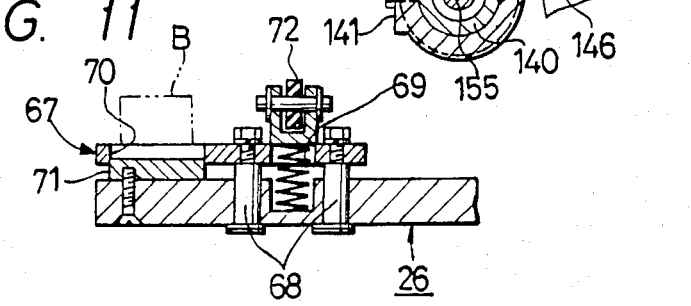

4,507,168

METHOD FOR MOUNTING A FAUCET ON A PAPER CONTAINER AND APPARATUS THEREFOR

TECHNICAL FIELD

The present invention relates to a method for mounting a faucet on a paper container and apparatus therefor, which container has recently been used widely as a container for milk, juice, liquor, or the like. The faucet serves to pour out the contents in the container.

BACKGROUND ART

Paper containers have heretofore been used for packing milk and juices, and recently, even for liquors, and their uses are extending now. When the contents in a paper container are poured out, it is necessary to peel or cut the bonded portion of the paper container. Therefore, the opening operation of a paper container is rather difficult and troublesome, and the pouring out of the contents is not easy. In addition, it is almost impossible to maintain its sealing effect after the container is opened. Thus, it is required, from the viewpoints of hygiene and preservation, to improve the containers of this type.

In order to eliminate these disadvantages of the paper containers and taking the facts into consideration that the paper containers can be fitted with faucets and the surfaces of them are coated with a thermoplastic resin film to improve waterproofness, the present invention intends to provide a method and apparatus for fixing a faucet made of synthetic resin to the thermoplastic resin coating, thereby improving the easy-opening property and maintaining the sealing property after a paper container is opened.

DISCLOSURE OF INVENTION

The present invention is characterized in that a predetermined portion of a paper container, where a faucet is to be mounted, and the end face of a faucet made of a synthetic resin are heated and the heated areas are pressed against each other for adhesion. The adhesion of the synthetic resin faucet to the paper container is accomplished by utilizing the property of the thermoplastic resin coating on the paper container which becomes soft and molten by heating.

The thermoplastic resin film on the paper container may be of any type material. However, polyethylene resins have usually been used, and other polypropylenes, modified polyesters, waxes, and the like may also be used.

Further, as synthetic resin for faucets, any resin which is excellent in adhesion to the thermoplastic resin coating on paper container can be used. For example, polyethylenes, polypropylenes and modified polyesters are used. If desired, an adhesive can be used between the container and the faucet.

Furthermore, the present invention is characterized in that a paper container retaining mechanism to hold a paper container and a faucet retaining mechanism to hold a faucet are provided and the paper container and the faucet are heated at adhesive portions thereof by a heater while they are held by the respective retaining mechanisms. These mechanisms are caused to approach to each other and then the paper container and the faucet are pressed together to accomplish the adhesion of them.

The paper containers which are widely used are of an upright rectangular parallelepiped and the top portion of which comprises slant surfaces on both upper sides. When it is intended to a mount a faucet for pouring out the contents on a paper container, its mounting position is naturally set to one of the slant surfaces. However, when the paper container having such a shape is stood upright and the slant surface to be applied with a faucet is heated, unevenness of heating is caused to occur between the upper portion and the lower portion of the slant surface because the lower portion of the slant surface is in contact with the liquid contents or the lower portion is quite near to the liquid surface. Therefore, complete adhesion of the faucet cannot be attained.

Accordingly, in the present invention, the paper container is provided with slant surfaces in its upper portion and a faucet is mounted on this slant surface. The paper container is so inclined that the above slant surface becomes horizontal and the distance between the slant surface and the liquid level of the contents is made even. In this state, the portion of the slant surface to be applied with a faucet is heated by a heater, thereby attaining uniform heating.

Further, according to the present invention, a heating element for heating a paper container is disposed on one side of the heater body and another heating element for heating a faucet is disposed on the other side thereof. Thus, the paper container and the faucet are heated under different conditions by using the single heater body, that is, under optimum conditions in compliance with the materials of the paper container and the faucet.

Furthermore, according to the present invention, a heater is disposed on a relative locus of a faucet and a paper container on which they are brought into contact with each other. The faucet and paper container are heated by this heater. After heating, the heater is removed from the relative locus and the faucet and the paper container are promptly pressed against each other to adhere to each other.

With regard to the shape of a faucet, it is preferred that a cutout for taking air is provided in an opening tube portion in order to permit the contents in a paper container to pour out. In the case of using such a faucet, it is necessary that the faucet is so mounted on the paper container that the cutout may be positioned on the upper side during the pouring operation. Therefore, the present invention is characterized by the provision of a means capable of orienting the faucet in a desired direction when the faucet is fed to a faucet retaining mechanism.

BRIEF DESCRIPTION OF DRAWINGS

FIG. 2 is a plan view of the faucet;

FIG. 8 is a vertical-sectional view taken along the line VIII—VIII of FIG. 4;

FIG. 11 is a vertical-sectional view taken along the line XI—XI of FIG. 10;

FIG. 18 is a cross-sectional view taken along the line XVIII—XVIII of FIG. 12;

BEST MODE FOR CARRYING OUT THE INVENTION

Figure 1:
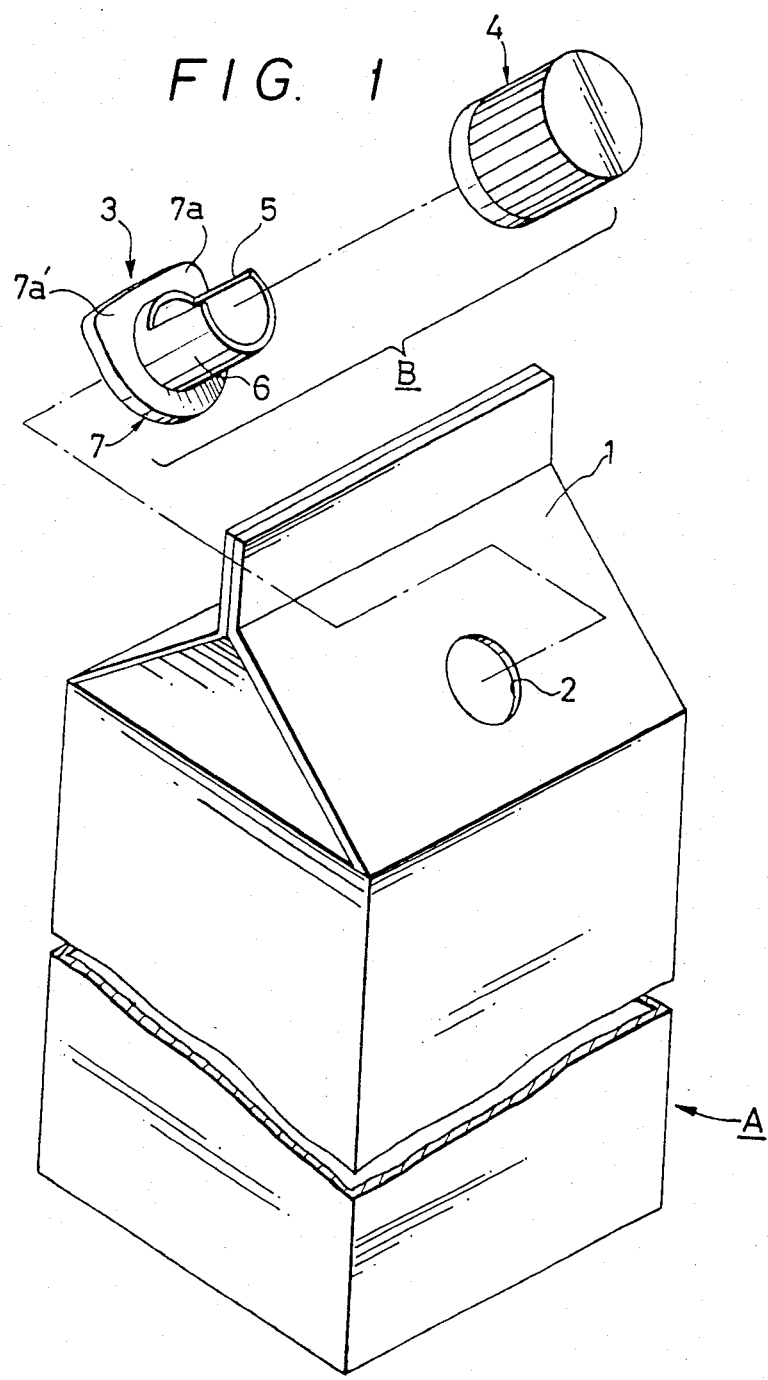
FIG. 1 is a perspective view showing a paper container and a faucet which are to be joined to each other.

The present invention will be explained in accordance with an illustrated embodiment. FIG. 1 is a perspective view showing a paper container (A) and a faucet (B) which are to be bonded to each other by means of an apparatus according to the present invention. The paper container (A) has the shape of a rectangular parallelepiped on the whole and it has slant surfaces (1) on the top thereof. An opening (2) is bored in a slant surface (1). The illustrated paper container (A) is not different from a conventional well-known one except the opening (2). While, the faucet (B) is composed of a spout member (3) and a cap member (4), and the spout member (3) comprises a tube portion (6) provided with a cutout (5) on one side thereof and a flange-like adhesive portion (7) which is formed at the end of the tube portion (6) and is to be fixed to the above-mentioned paper container (A). The cap member (4) is made in the form of a cylinder having a closed end. The thus formed cap member will be fitted to the tube portion (6) to seal up the opening of the tube portion (6) and the cutout (5), thus the paper container (A) can be closed.

The paper container (A) and the faucet (B) are caused to adhere to each other by heating the periphery of the opening (2) of the paper container (A) and the end face of the faucet (B) and pressing them to each other by the apparatus of the present invention, while the cap member (4) is fitted to the spout member (3). In this case, it is necessary that the faucet (B) is fixed to the paper container (A) with orienting the cutout (5) upward. In order to determine the direction of the faucet (B), lugs (7a) and (7a') are formed on both sides of the cutout (5) and on the periphery of the circular adhesive portion (7), so as to make the latter almost D-shape. The thus formed adhesive portion (7) has the contour desirable to determine the direction of the cutout (5).

Figure 3:
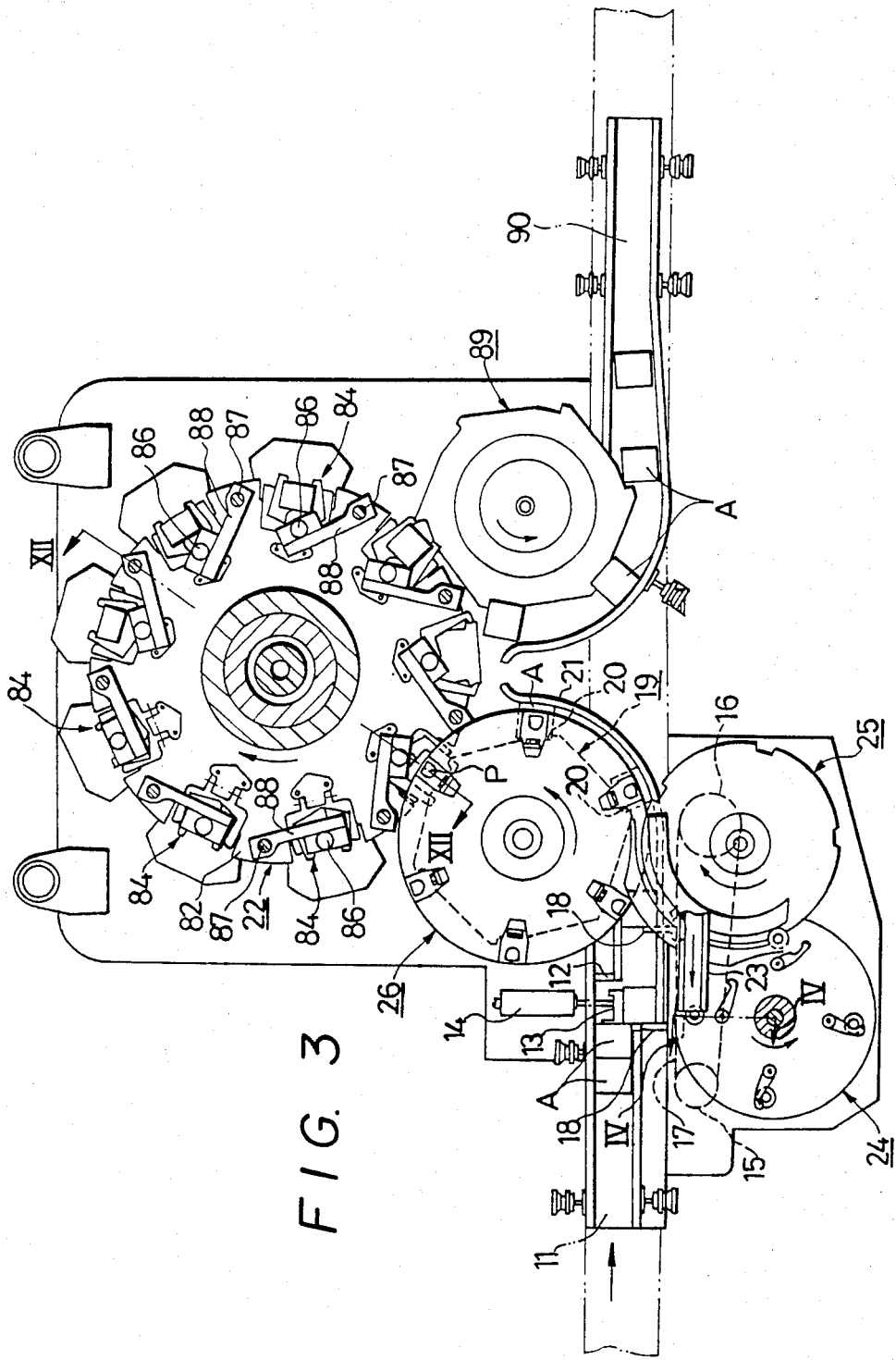
FIG. 3 is a schematic plan view showing an embodiment of the present invention.
Figure 4:
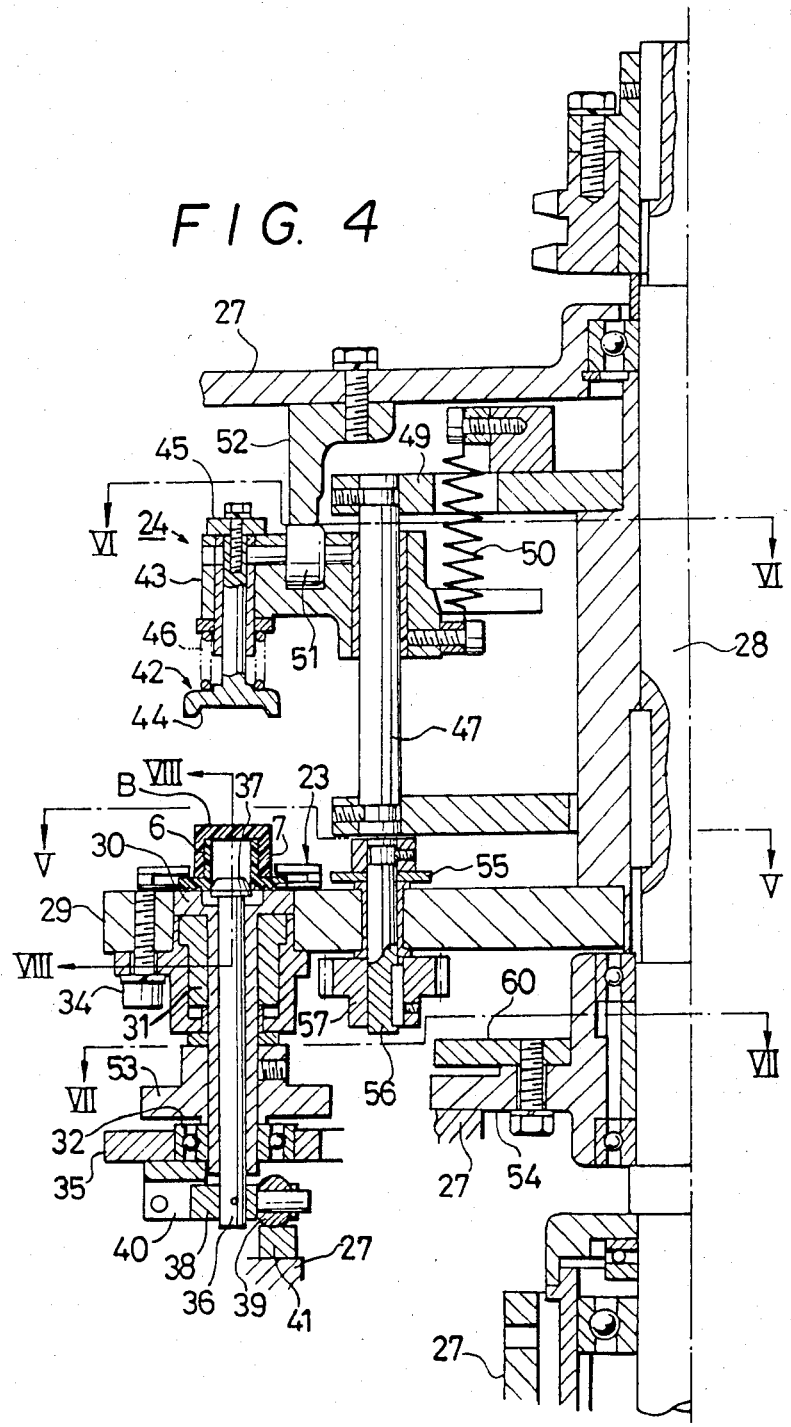
FIG. 4 is an enlarged sectional view taken along the line IV—IV of FIG. 3.

The embodiment of the apparatus suitable for the adhesion of the paper container (A) and the faucet (B) according to the present invention will be described with reference to FIG. 3 and succeeding drawings. FIG. 3 is the schematic plan view of the apparatus according to the present invention, and in this drawing, the paper containers (A) are continuously fed by a feed conveyor (11) and are stopped by a stationary stopper (12) which is disposed at the front end of the feed conveyor (11). In front of the stationary stopper (12), an L-shaped push member (13) is disposed, and is moved back and forth in the direction crossing the feed conveyor (11) at right angles by means of a cylinder device (14). The push member (13) has a push portion for transversely pushing the paper container (A) which is stopped in contact with the stationary stopper (12) and a stopper portion for stopping the next paper container. In other words, the work of the push member (13) is to transversely push out the paper containers (A) one by one with the aid of the cylinder device (14).

On the side where the paper container (A) is pushed out, there is disposed a chain (17) in parallel with the feed conveyor (11), with the chain being stretched between a pair of sprocket wheels (15) and (16). The chain (17) is provided with engaging chips (18) at predetermined intervals. The cylinder device (14) pushes out each paper container (A) one by one to each region between one and the next engaging chips (18) that are continuously moved by the chain (17), whereby each interval of the spaces between the engaging chips (18) is set between adjacent paper containers (A).

In front of the chain (17) for carrying the paper containers (A), a star wheel (19) is disposed. It rotates synchronously with the chain (17) and is provided with pockets (20) formed at regular intervals on the periphery thereof and vacuum cups, not shown, disposed in the respective pockets, for attracting the paper containers (A) by suction, and a stationary guide (21) disposed along the outer periphery thereof. The star wheel (19) feeds the paper containers (A) to a carriage or rotator (22), mentioned below, with the aid of the above-mentioned members.

Figure 10:
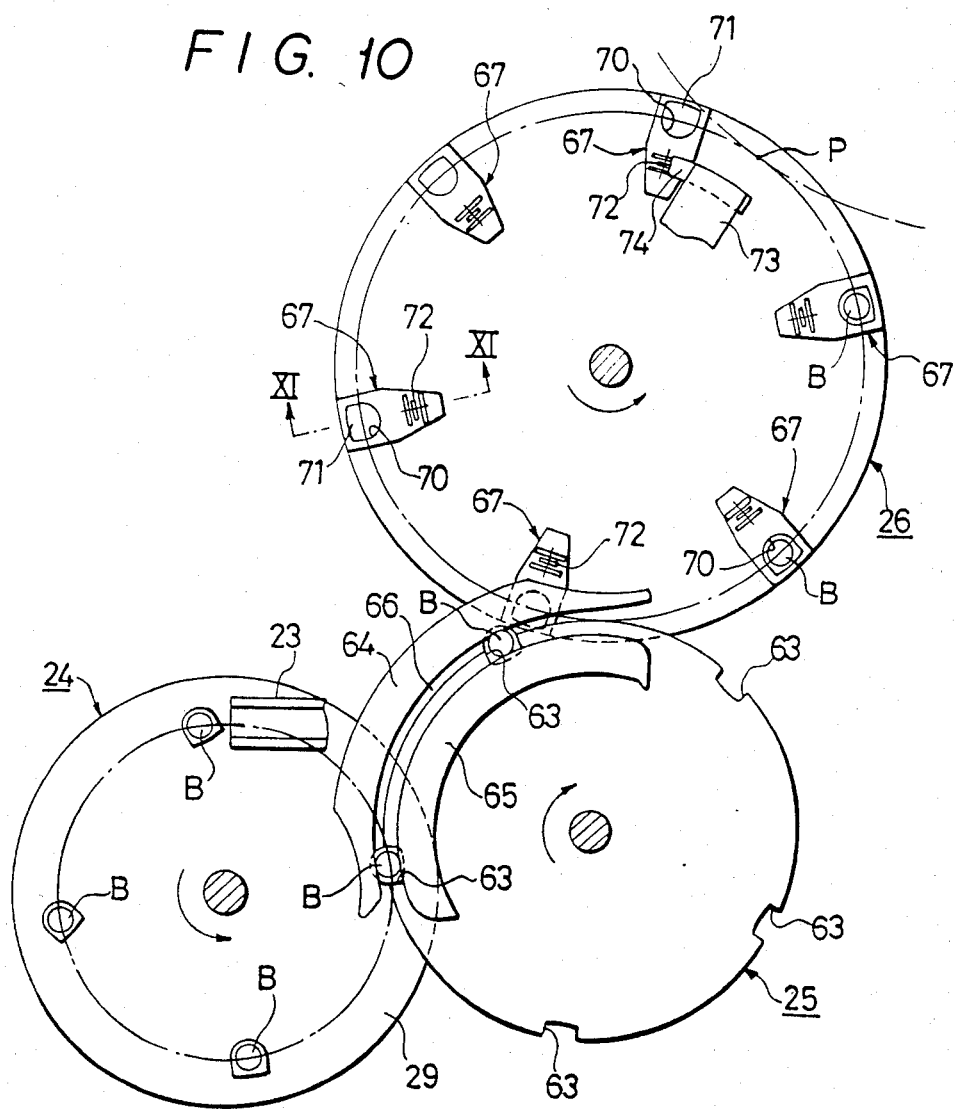
FIG. 10 is an enlarged plan view of the main part in FIG. 3.

Further, the faucets (B) to be mounted on the paper containers (A) are conveyed through a chute (23) to a positioning mechanism (24) for orienting the faucets (B) to a predetermined direction, and those which were oriented by the mechanism (24) are fed to the rotator (22) through faucet conveying discs (25) and (26) (see FIG. 10). FIGS. 4 to 8 show the positioning mechanism (24), which includes a vertical drive shaft (28) rotatably fixed to a frame (27) and a rotary table (29) mounted on the drive shaft (28). The rotary table (29) is provided with rotary stages (30) to receive the respective faucets (B) thereon, at regular intervals of 90° on its periphery. The vertical shaft of each rotary stage (30) is rotatably supported by a plain bearing (31) and a roller bearing (32). The plain bearing (31) is supported by a cylindrical bracket (33) surrounding it and a screw (34) which secures the bracket (33) to the rotary table (29). The roller bearing (32) is supported by a ring-like supporting plate (35) disposed around the drive shaft (28) and a coupling member, not shown, which secures the supporting plate (35) to the rotary table (29) at a middle position of each rotary stage (30).

In the shaft portion of each rotary stage (30), there is a vertically slidable lift rod (36), which rod has a conical centering member (37) on the top for centering the faucet (B). The diameter of the centering member (37) is equal to the inner diameter of the tube portion (6) of the faucet (B). The lower end of the lift rod (36) extends downwards through the shaft portion of the rotary stage (30). A horizontal bracket (38) is fixed to the projected end and a cam follower (39) is rotatably mounted on the bracket (38). The ring-like supporting plate (35) is provided with a rotation preventing member (40) on the under surface thereof. The rotation preventing member (40) is movably supporting the bracket (38) on both the sides thereof to prevent the lift rod (36) from rotation. The lift rod (36) lies generally at the lowermost position by its own weight. At this time, the upper surfaces of the centering member (37), the rotary stage (30) and the rotary table (29) are substantially on the same level. In the movement of the cam follower (39) at a position near the front end of the foregoing chute (23), the cam follower (39) is moved upwards by a cam plate (41) that is fixed to the machine frame (27). With this movement, the centering member (37) is lifted by means of the bracket (38) and the lift rod (36).

The front end of the chute (23) ascends in a tangential direction from a point of the rotary orbit of the centering member (37), (FIG. 8). The faucets (B) are continually fed to the front end of the chute by their own weight with both sides of the adhesive portion (7) of each faucet (B) being supported by the chute (23). The front end of the chute is provided with an engaging pawl which comprises a spring (not shown). The faucet (B) is stopped by engaging with the engaging pawl at the front end of the chute (23), whereby the faucets (B) are prevented from dropping off the chute (23) by their own weight. When approaching the front end of the chute (23) through the rotation of the rotary table (29), the centering member (37) is lifted by the cam of the cam plate (41) and it is laid in a condition to engage with the faucet (B), which faucet is stopped at the front end of the chute (23), as shown in FIG. 8. When the centering member (37) engages with the faucet (B), the latter is drawn out of the chute (23) against the action of the engaging pawl spring and is put on the rotary stage (30), and the centering of the faucet (B) is simultaneously accomplished by the centering member (37) having the conical head. After the centering member (37) has drawn out of the faucet (B), a next faucet (B) advances downwards by its own weight and is stopped by the engaging pawl. The faucet (B) at this point is in a condition capable of being drawn out by means of a next centering member (37).

The faucet (B), which has been drawn out of the chute (23) by the centering member (37) and put on the rotary stage (30), is then pressed against the rotary stage (30) by the press member (42). The press member (42) is vertically movably mounted an a movable frame (43) above each of four rotary stages (30). The bottom surface ot each press member (42) is provided with a conical guide recess (44), which ensures the centering of the faucet (B) in cooperation with the centering member (37) at the time of pressing the faucet (B). The top of each press member (42) is provided with a fastening member (45) and a spring (46) is arranged between the press member (42) and a movable frame (43). Thus, the press member (42) is pressed downwards by the action of the spring (46).

Figure 6:
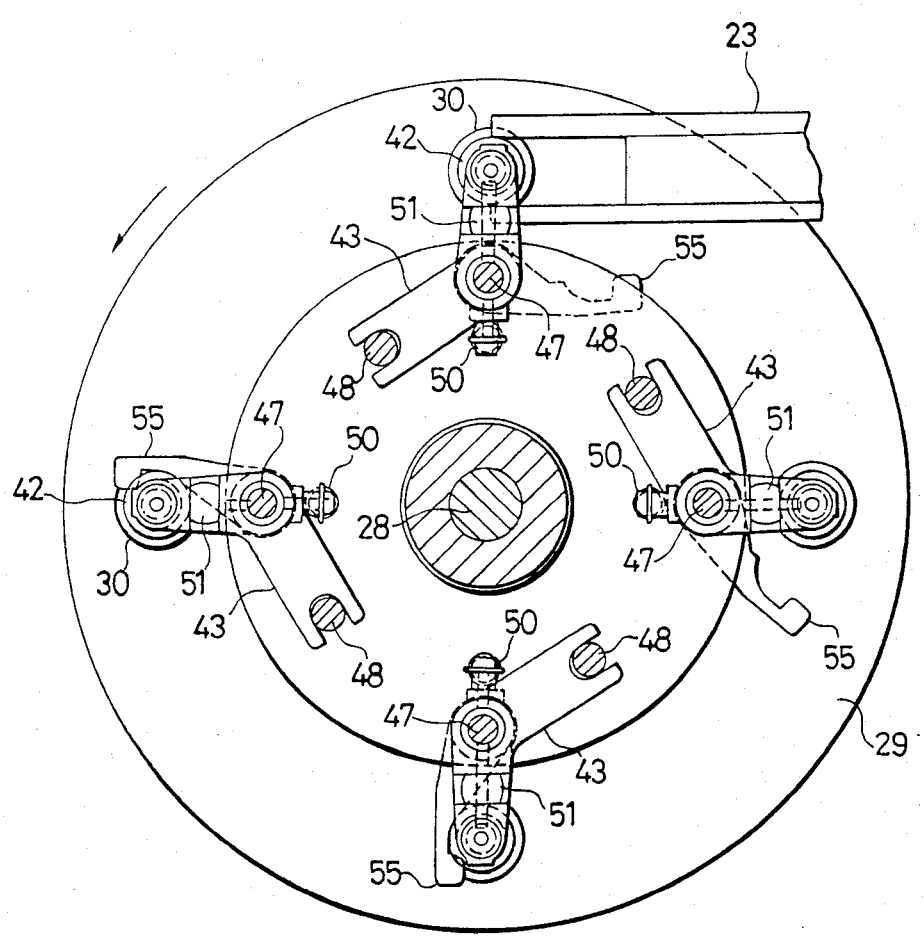

Each movable frame (43) can be moved vertically along two parallel guide rods (47) and (48) (see FIG. 6). A spring (50) is disposed between the movable frame (43) and a disc (49) associated with the guide rods (47), (48) so as to apply upward spring force to the movable frame (43). A cam follower (51) is rotatably fitted to each movable frame (43) and it is caused to engage, by the spring (50), with a cam member (52) that is fixed to the frame (27) above the locus of the cam follower (51).

The movable frame (43), when passing through the front end of the chute (23), is raised in accordance with the cam profile of the cam member (52) in order to avoid the interference with the chute (23). When there is not any possibility of such an interference at the front end of the chute (23), the movable frame (43) is moved down against the action of the spring (50) by the cam member (52). Together with this descent of the movable frame (43), the press member (42) is also moved down and it is brought into engagement with the top of the faucet (B) which has been drawn out of the chute (23) onto the rotary stage (30). After the engagement of the press member (42) with the faucet (B), the movable frame (43) is further moved down by the cam member (52) by a predetermined distance. Thus, the faucet (B) is caught between the rotary stage (30) and the press member (42) by the spring action of the spring (46). At this time, the centering of the faucet (B) is attained by the guide recess (44) of the press member (42) and the above-mentioned centering member (37). After the completion of the centering operation, the centering member (37) is moved down by the function of the cam plate (41) and its own weight until the upper surface of the centering member (37) substantially reaches the upper surfaces of the rotary stage (30) and the rotary table (29).

Figure 7:
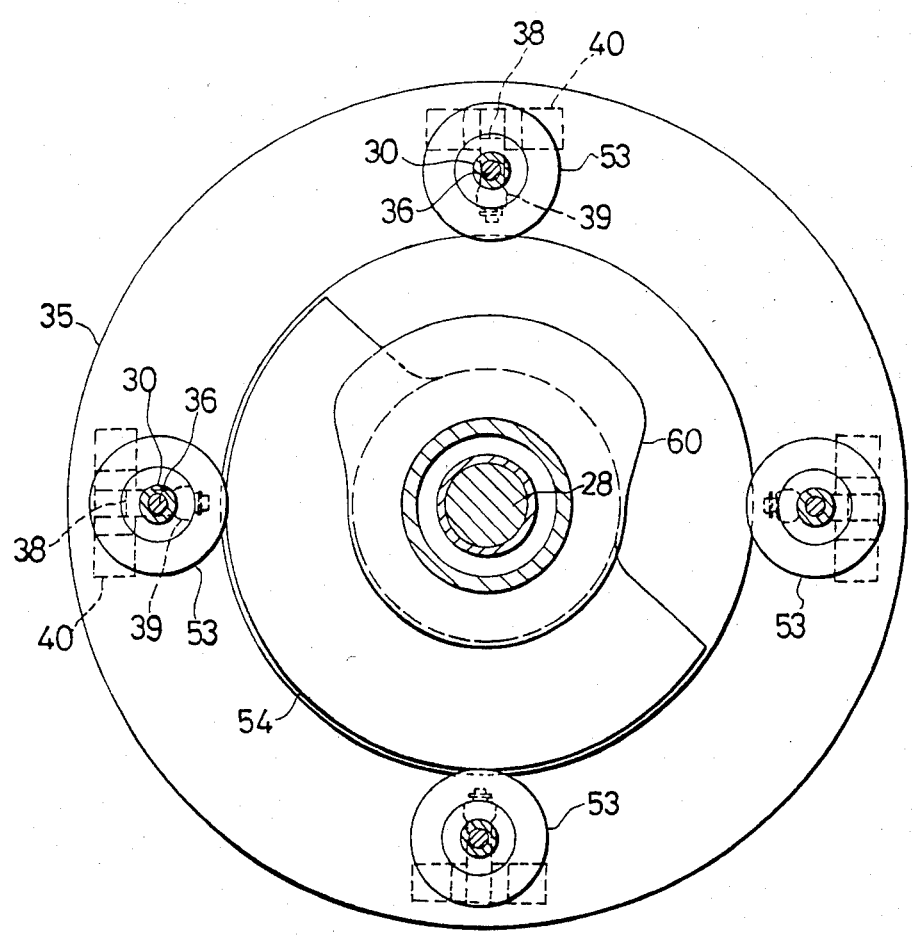

Next, the faucet (B) is rotated with the rotation of the rotary stage (30) while it is supported between the rotary stage (30) and the press member (42). In order to rotate each rotary stage (30), a friction disc (53) is integrally fixed to the rotary stage (30), and a friction cam plate (54) is fixed to the frame (27), which friction cam plate (54) is brought into contact with the outer periphery of the friction disc (53) over a predetermined angle range around the drive shaft (28), as shown in FIG. 7. In the case of the illustrated embodiment, the cam plate (54) spreads an angle range more than 180° and the diameter of the friction disc (53) is made such that the friction disc (53) and the rotary stage (30) are rotated approximately twice.

Figure 5:
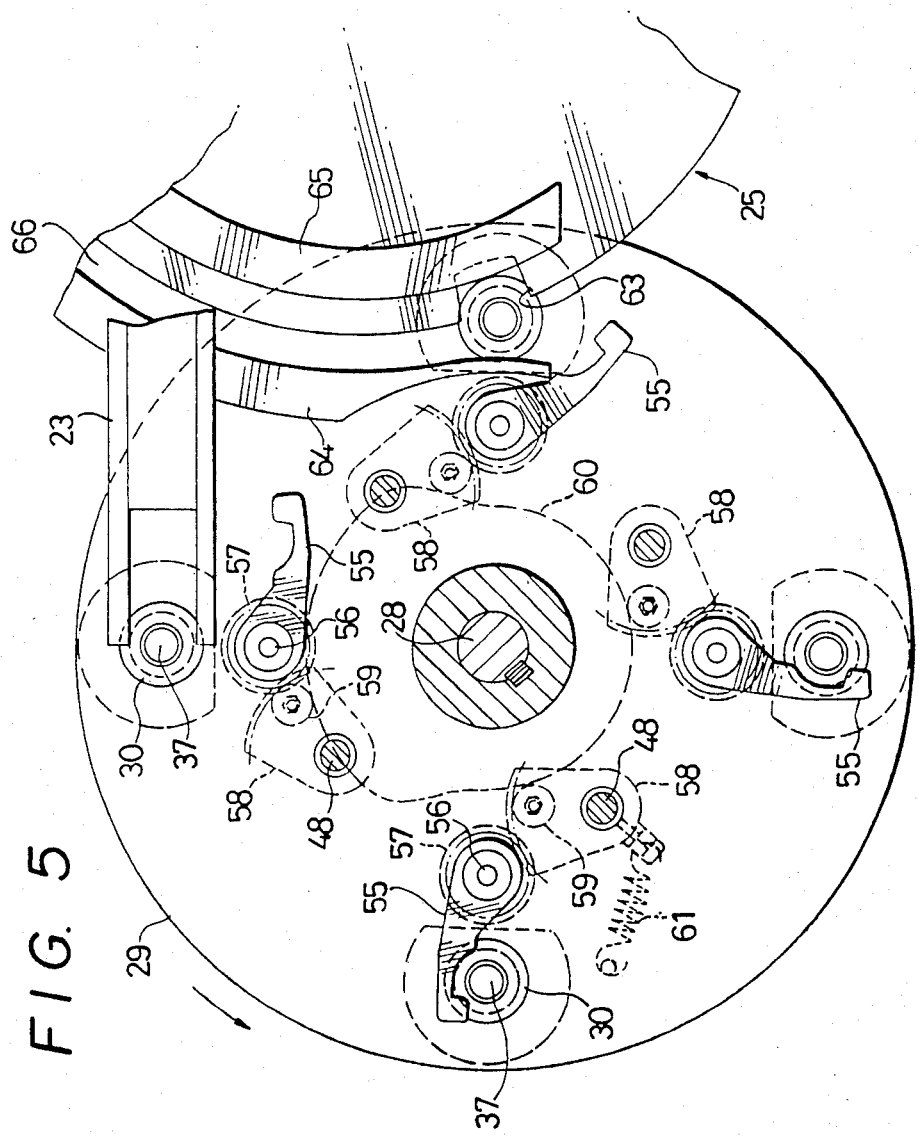
FIGS. 5, 6 and 7 are cross-sectional views taken along the lines V—V, VI—VI and VII—VII of FIG. 4, respectively.

Furthermore, simultaneously with the rotation of the faucet (B), the engaging pawl (55) is brought into engagement with the outer periphery of the adhesive portion (7) of the faucet (B), and when the faucet (B) is oriented to a predetermined direction, the engaging pawl (55) engages with the lug (7a) of the adhesive portion (7) to block a further rotation of the faucet (B), thereby setting the orientation of the faucet (B). Each of the four pawls (55) is rotatably mounted on the axis (56) inside the rotary stage (30) so that each pawl (55) may be rotated relative to the rotary table (29). The lower end of each axis (56) is provided with a pinion (57) and the pinion is in turn engaged with a sector gear (58), as shown in FIG. 5. Of the two parallel guide rods (47) and (48) mentioned above, one guide rod (48) has the lower end that is projected downward through the rotary table (29) and the sector gear (58) is rotatably mounted on the foregoing projected end. A cam follower (59) is rotatably fitted to each sector gear (58) on the bottom surface thereof and is engaged by a spring (61) with the cam profile of the cam plate (60) which is secured to the frame (27). Although FIG. 5 shows only one spring (61), the other springs (61) are also provided between the sector gears (58) and the rotary table (29), and each spring action of them permits the cam follower (59) to elastically engage with the cam face of the cam plate (60).

Each sector gear (58) having the cam follower (59) is moved in accordance with the profile of the cam plate (60) around the guide rod (48) as a fulcrum. When the sector gear (58) is moved, the engaging pawl (55) is moved by means of the pinion (57) and the axis (56) gearing with the sector gear (58). When passing the front portion of the chute (23), each engaging pawl (55) is moved apart from the rotary stage (30) to avoid the interference with the front portion thereof. Each faucet (B) which passes the front end of the chute (23) is caught between the rotary stage (30) and the press member (42) by the action of the spring (46), where the engaging pawl (55) is brought into engagement with the adhesive portion (7) of the faucet (B) by the cam plate (60) and the spring (61). Almost simultaneously therewith, the friction cam plate (54) is brought into contact with the circumference of friction disc (53) that is integral with the rotary stage (30). By the frictional force between them, the friction disc (58) together with the rotary stage (30), the faucet (B) and the press member (42) are rotated.

Figure 9A:
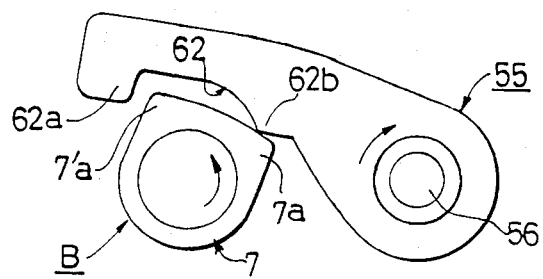
FIG. 9 (a), (b) and (c) are schematic plan views showing different states of operations of the main part of a positioning mechanism shown in FIGS. 4 to 8.
Figure 9B:
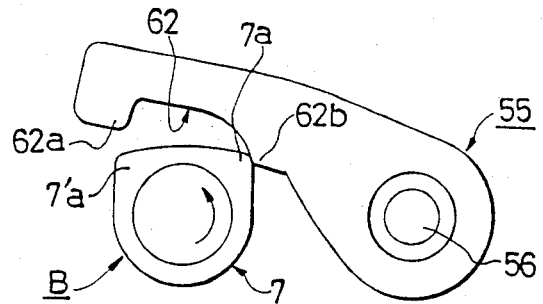
Figure 9C:
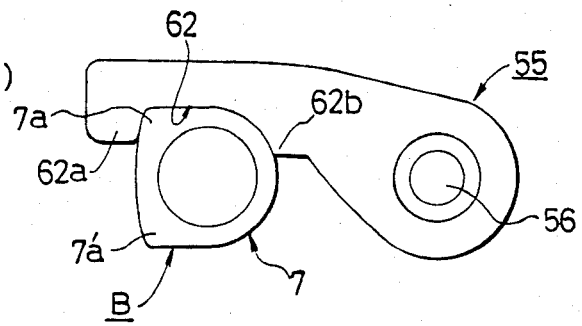

The portion of the engaging pawl (55) to be brought into contact with each faucet (B), comprises an oblong plate region having an engaging recess (62) corresponding to the shape of one lug (7a) of the adhesive portion (7) and the succeeding circular portion as particularly shown in FIG. 9 (c). The front portion of the engaging recess (62) comprises a stopper portion (62a) for stopping the rotation of the faucet (B) by engaging with the lug (7a) and the rear portion of the engaging recess (62) comprises an escape portion (62b) for preventing the other lug (7a') from engaging with the stopper portion (62a). That is to say, as shown in FIG. 9 (a), when the faucet (B) is rotated and the other lug (7a') approaches the stopper portion (62a), the other lug (7a) is brought into contact with the escape portion (62b) and the engaging pawl (55) is rotated clockwise in FIG. 9 (a) in order to prevent the other lug (7a') from engaging with the stopper portion (62a). Then, the lugs (7a') and (7a) pass the stopper portion (62a) and the escape portion (62b), respectively (FIG. 9 (b)), and the faucet (B) is further rotated, whereupon the one lug (7a) is caused to engage with the stopper portion (62a) to stop further rotation of the faucet (B).

Such an engagement between the lug (7a) and the stopper portion (62a), that is, the setting of the orientation of the faucet (B) is carried out during the only one rotation of the faucet (B). In the case of the illustrated embodiment, both the lugs (7a) and (7a') of each faucet (B) are arranged in a condition that they are outwardly oriented in the radial direction of the rotary table (29). As each faucet (B) is forced to stop its rotation by the engaging pawl (55) in the course of the integral rotation of the rotary stage (30) and the faucet (B) as described above, the faucet (B) is merely pressed against the rotary stage (30) by the spring (46), therefore the rotary stage (30) alone is still rotated with slippage that is easily caused to occur between the faucet (B) and the rotary stage (30).

Each of the thus oriented faucets (B) is delivered to the succeeding faucet conveying disc (25) at a position where it is rotated about ¾ from the front end of the chute (23). As shown in FIGS. 3, 5 and 10, cutout portions (63) are formed at five positions equally spaced along the outer periphery of the disc (25) and each of them are adapted to receive a pair of lugs (7a) and (7a') of the faucet (B) which are outwardly directed on the rotary table (29). Further, a pair of guides (64) and (65) for guiding each cap member (4) of the faucet (B) extends between the position where the faucet (B) is delivered from the rotary table (29) to the disc (25) and the position where it is delivered from the disc (25) to a downstream disc (26). A delivery plate (66) for supporting the bottom of the faucet (B) is disposed between the discs (25) and (26) and under the guides (64) and (65).

When each faucet (B) which has been positioned on the rotary stage (30) approaches the position for the delivery of the faucet (B) to the disc (25), the engaging pawl (55) is separated from the outer periphery of the adhesive portion (7) of the faucet (B) by means of the cam plate (60) because the contact between the friction disc (53) and the friction cam plate (54) has already been released and thus the rotation of the rotary stage (30) has been stopped. Since the engaging pawl (55) is disposed at a position lower than the pair of guides (64) and (65) for guiding the cap member (4), the engaging pawl (55) can be moved back to the position where it does not interfere with the front end of the chute (23) without any interference with the guides (64) and (65). Each faucet (B) released from the engaging pawl (55) is immediately caused to engage with the cutout of the disc (25) to stop its free rotation. The movable frame (43) is simultaneously lifted by the cam member (52) and the spring (50), so that the pressure of the faucet (B) by the press member (42) is released. Subsequently, the press member (42) is moved up to the position where it does not interfere with the front end of the chute (23).

Meanwhile, each faucet (B) engaging with the cutout (63) of the disc (25) is guided by the guides (64) and (65) from the rotary stage (30) through the rotary table (29) and the delivery plate (66) to the next faucet forwarding disc (26). This disc (26) has a plurality of faucet receiving members (67) which are spaced at regular intervals on the upper surface of the outer periphery. Each faucet receiving member (67) is, as shown in FIG. 11, movably fitted to the upper surface of the disc (26) by a pair of pins (68) and is usually maintained at the upper position by the action of a spring (69). Each faucet receiving member (67) is provided with an engaging hole (70) having the same shape as the adhesive portion (7) of the faucet (B), and each hole (70) is formed so as to receive the adhesive portions (7) when both the lugs (7a) and (7a') are directed toward the outer side of the rotary plate (26). The disc (26) is provided with a supporting rest (71) which moves within the engaging hole (70) by the vertical movement of the faucet receiving member (67). The height of this supporting rest (71) is such that its surface forms a substantially flat plane with the surface of the faucet receiving member (67) when the latter lies at its lower position. Further, the upper face of each faucet receiving member (67) is provided with a cam follower (72) and each of stationary frames (73) is fixed with a cam member (74) which is caused to engage with the cam follower (72). The cam member (74) pushes down the faucet receiving member (67) against the spring (69). This cam member (74) is formed near the following position (P) (see FIG. 10) for delivering the faucet to a faucet retaining mechanism that is disposed on the rotator (22).

The faucet receiving member (67) is so arranged that its surface may lie on the same level as the surface of the delivery plate (66) when it is at an upper position. Therefore, each faucet (B), which is slid on the delivery plate (66) with the aid of the cutout portion (63) and a pair of guides (64) and (65), is slipped on the surface of the faucet receiving member (67) and dropped into the engaging hole (70). The faucet (B) cannot freely rotate in this state and it is transferred by the disc (26) with directing its lugs (7a), (7a') outwards. When the faucet (B) approaches the delivery position (P) to the following rotator (22), the faucet receiving member (67) is moved down by the cam member (74), so that the upper surface of the supporting rest (71) for supporting the faucet (B) is set on the same level as the faucet receiving member (67). Each faucet (B) on the supporting rest (71) is then held and smoothly forwarded by the faucet retaining mechanism, referred to below, of the rotator (22).

As shown in FIG. 3, the disc (26) for feeding the faucets (B) to the rotator (22) is disposed on and integrally with the star wheel (19) for feeding the paper containers (A) to the rotator (22). The faucet receiving members (67) of the disc (26) are made to coincide with the number and positions of the pockets (20) of the star wheel (19), thereby the paper containers (A) and the faucets (B) above the containers being fed to the rotator (22) almost simultaneously.

Figure 12:
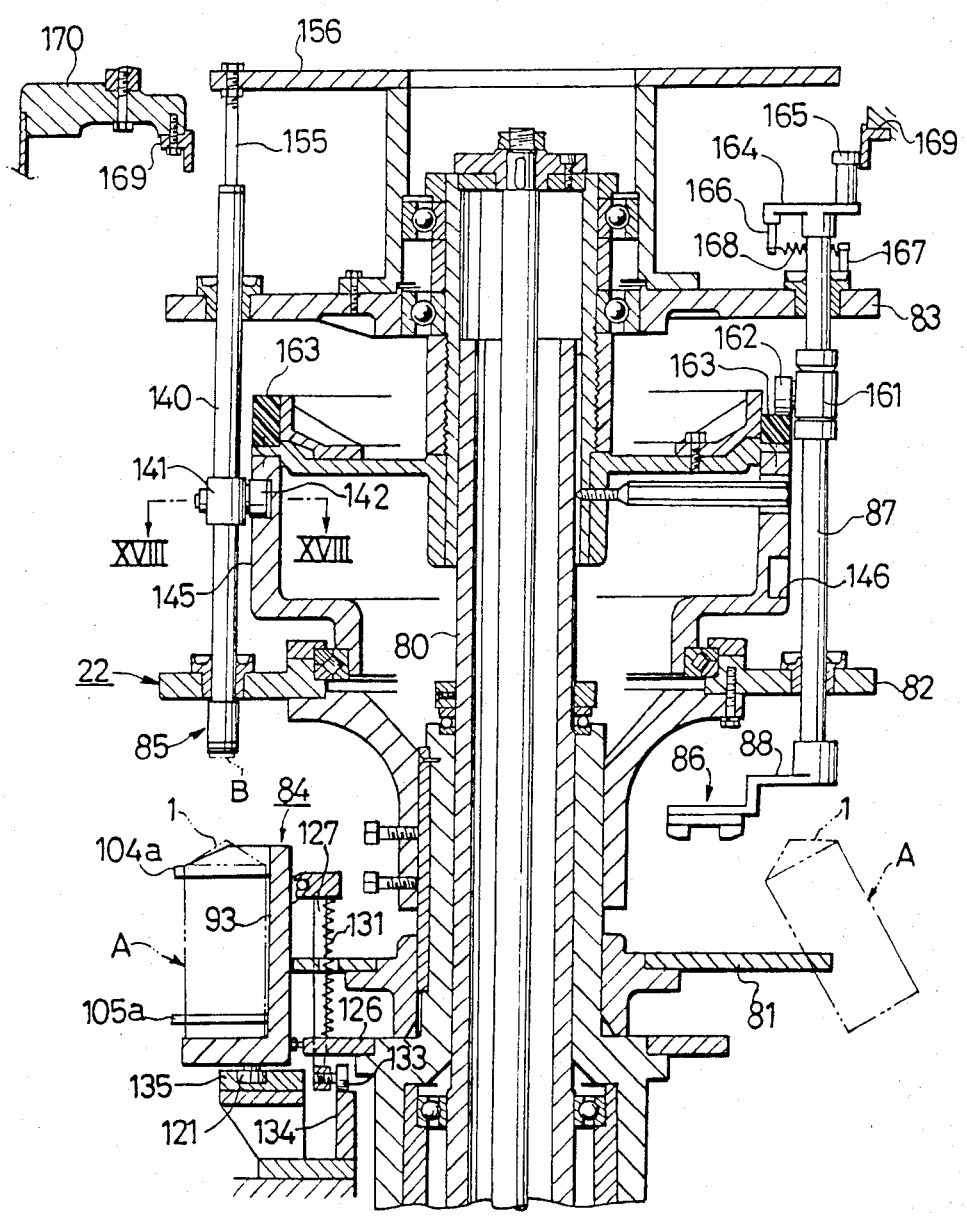
FIG. 12 is an enlarged vertical-sectional view taken along the line XII—XII of FIG. 3.
Figure 13:
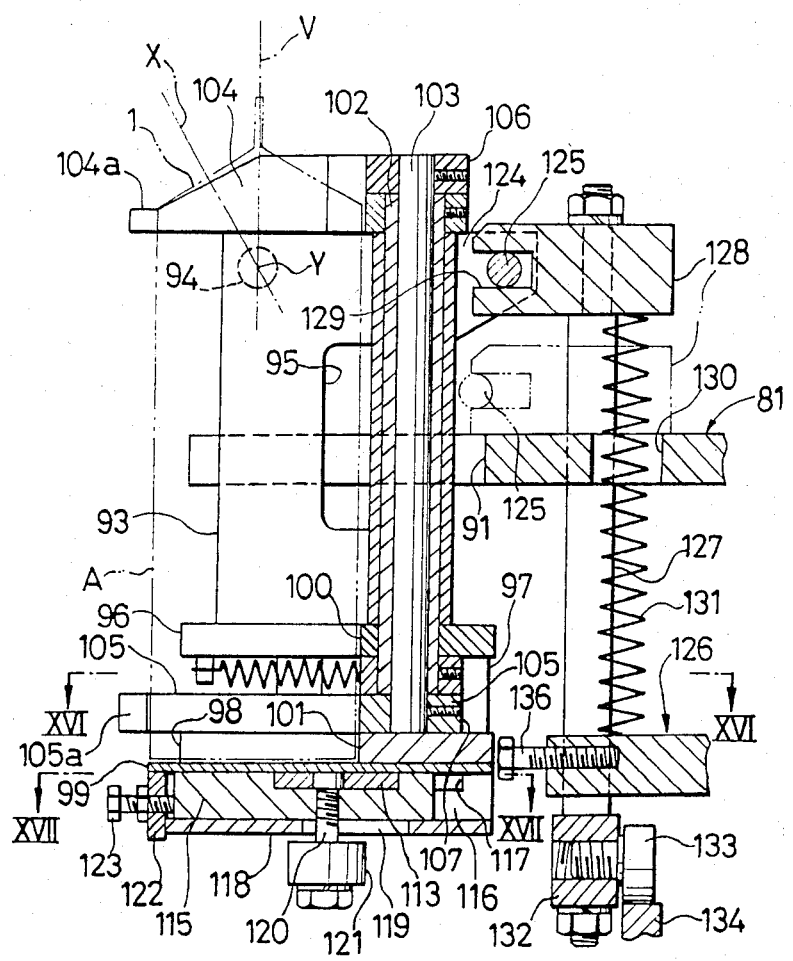
FIG. 13 is an enlarged view of the main part in FIG. 12.

FIG. 12 shows the sectional view of the rotator (22) taken along the line XII—XII of FIG. 3. The rotator (22) includes three rotary discs (81), (82) and (83) which are rotatably mounted on the vertical stationary shaft (80). These rotary discs (81), (82) and (83) are integrally connected to one another. As will be understood from FIGS. 3 and 12, the lower rotary disc (81) is provided on the outer periphery thereof with nine paper container retaining mechanism (84) at regular intervals while two upper discs (82) and (83) are provided with vertically movable faucet retaining mechanisms (85) at the positions right above the respective paper container retaining mechanism (84). Operating rods (87) having a heater (86) at their lower ends are mounted in the middle of the adjacent faucet retaining mechanisms (85). The rod (87) is rotatable and vertically movable.

The paper container retaining mechanism (84) receives the paper container (A) from the star wheel (19) in the vertical state to retain it by means of retaining pawls so as not to fall therefrom. The retaining mechanism (84) inclines the paper container (A) to make horizontal the slant surface (1) having the opening (2). The faucet retaining mechanism (85) receives the faucet (B) at the faucet delivering position (P) from the disc (26) that is disposed on the star wheel (19). The thus received faucet (B) is placed just above the horizontally arranged opening (2) of the slant surface (1). Each of the heaters (86) is connected to the operating rod (87) by an arm (88) in a condition being biased from the axis of the rod. When the faucet (B) vertically confronts the opening (2) of the paper container (A), the heater (86) is inserted in the space between the faucet (B) and the paper container (A) by the rotation of the operating rod (87). The spaces between the slant surface (1) of the paper container (A) and the lower surface of the heater (86) and between the upper surface of the heater (86) and the adhesive portion (7) of the faucet (B) are then reduced. As a result, the slant surface (1) and the adhesive portion (7) are heated by the heater (86).

After completion of the heating operation by the heater (86), the above-mentioned spaces between the heater (86) and the paper container (A) as well as the faucet (B) are enlarged. The heater (86) is then removed out of the space between the faucet (B) and the paper container (A). In the next step, the faucet retaining mechanism (85) is moved down and the adhesive portion (7) of the faucet (B) is pressed for adhesion against the slant surface (1) of the paper container (A). After the faucet (B) was attached to the paper container (A), the faucet retaining mechanism (85) releases the faucet (B) and moves upward. On the other hand, the paper container retaining mechanism (84) returns to the upright state and releases the grasp of the paper container (A) by the pawl. The thus released paper containers are each discharged out of the rotator (22) by means of a star wheel (89) on the discharge side which is formed similarly to the star wheel (19) on the feed side. Then, they are shifted to the next step by a conveyor (90).

FIGS. 13 to 17 show a practical constitution of the paper container retaining mechanism (84). As will be understood from the plan view of FIG. 15, the rotary disc (81) is provided on the outer periphery thereof with an approximately trapezoidal cutout (91). A pair of brackets (92) is secured to opposite portions on the cutout (91). Between this pair of brackets (92), a main body (93) having a U-shaped section is swingably supported by pins (94). This main body (93) is provided at opposite corners thereof with cutouts (95) for the purpose of avoiding interference with the trapezoidal cutout (91).

A plate (96) is secured on the bottom surface of the main body (93). The plate (96) is provided on the bottom thereof with a plate (98) suitably spaced by interposing spacers (97). The plate (98) is provided on the bottom thereof with a supporting plate (99) for supporting the paper container (A). The supporting plate (99) has such a shape as to close the lower end surface of the main body (93) having a U-shaped section and it supports the bottom of the paper container (A) that is led into the main body (93). The two plates (96) and (98) on the supporting plate (99) have cutouts (100) and (101), the shapes of which are about the same as the inner shape of the main body (93) so as not to obstruct the received container (A).

A vertical cylindrical axis (102) is rotatably mounted at the central position on the back side of the main body (93) and an axis (103) is rotatably inserted in the cylindrical axis (102). The upper end and lower end portions of the cylindrical axis (102) protrude from the upper surface of the main body (93) and the lower surface of a plate (96), respectively, and these upper and lower projected end portions are provided with L-shaped arms (104) and (105), respectively, on the same side. Further, the upper end and lower end portions of the axis (103) projects from the upper and lower ends of the cylindrical axis (102), respectively. These upper and the lower projected portions are provided with L-shaped arms (106) and (107), respectively, which are formed symmetrically with respect to the above-mentioned L-shaped arms (104) and (105). Therefore, the arms (104) and (105) as well as the arms (106) and (107) are integrally operated by the cylindrical axis (102) and the axis (103), respectively. Thus they support in pairs the paper container (A) on three outer side walls of the paper container (A). At the free ends of the respective arms (104) to (107), there are provided support pawls (104a), (105a), (106a) and (107a) for supporting the other side walls of the paper container (A).

Figure 14:
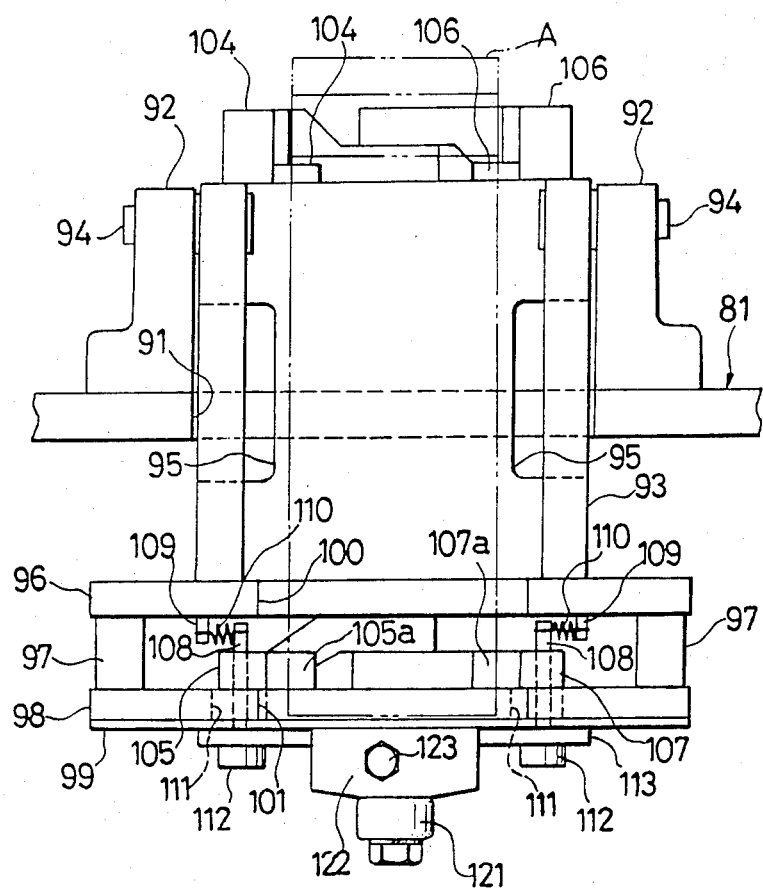
FIG. 14 is a front view of FIG. 13.
Figure 15:
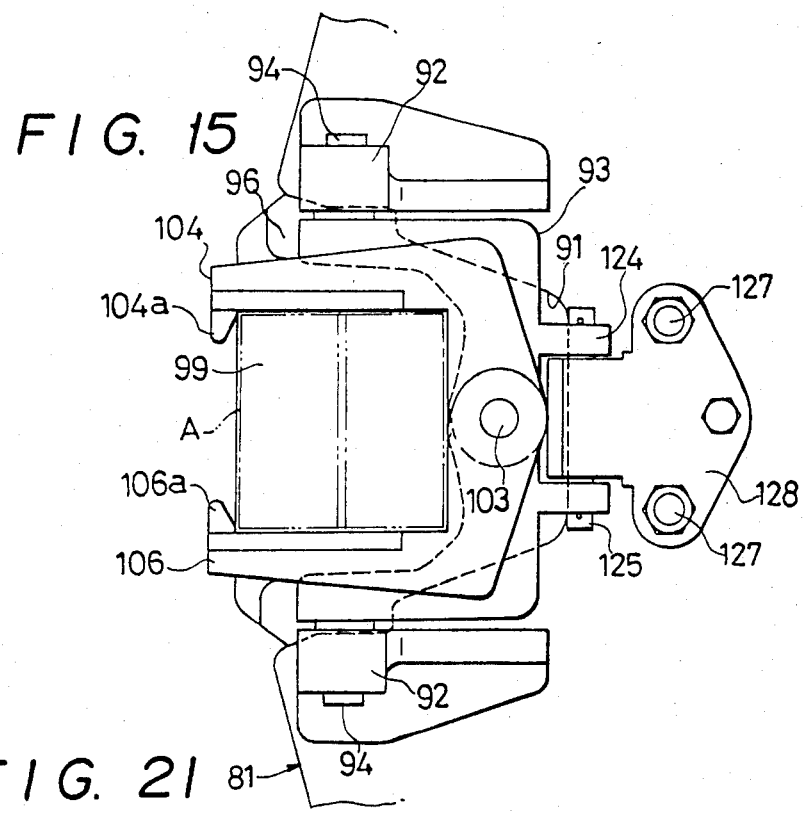
FIG. 15 is a plan view of FIG. 13.
Figure 16:
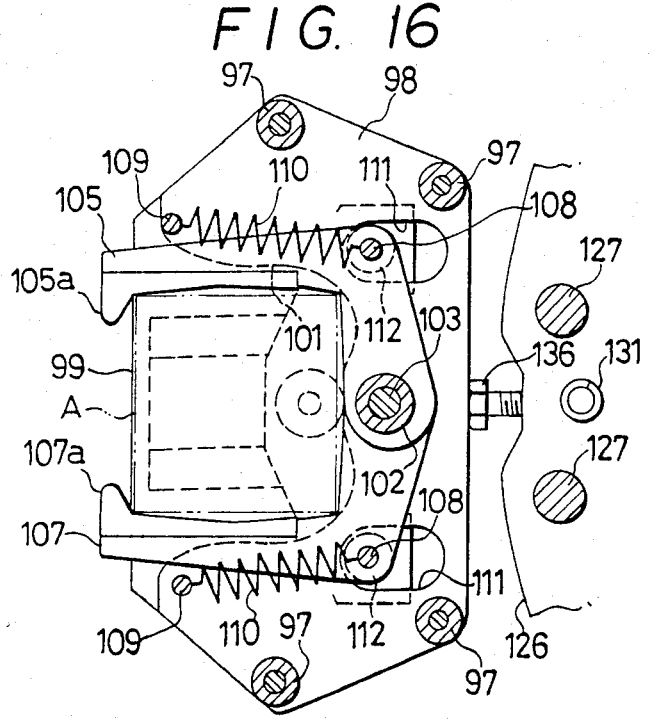
FIGS. 16 and 17 are cross-sectional views taken along the lines XVI—XVI and XVII—XVII of FIG. 13, respectively.
Figure 17:
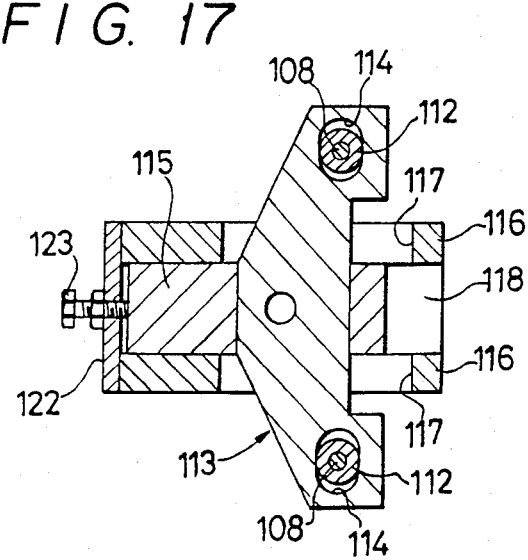

As shown in FIGS. 14 and 16, the lower pair of arms (105) and (107) are provided at the corners thereof with vertical pins (108). At opposite under side ends of the plate (96), pins (109) are attached. Tension springs (110) are disposed between the pairs of pins (108) and (109). With this constitution, the spring action by one spring (110) is applied to the arm (105) and the arm (104) that is integrally connected by the cylindrical axis (102) are turned counterclockwise around the cylindrical axis (102) in FIG. 16. The spring action of the other spring (110) is applied to the arm (107) and the arm (103) that is integrally connected by the axis (103) are urged clockwise around the axis (103) in FIG. 16. Therefore, the arms (104) to (107) and the supporting pawls (104a) and (107a) are generally adapted to hold the paper container (A) therein.

On the other hand, the lower ends of the pins (108) that are disposed on the pair of lower arms (105) and (107) project downward passing freely through holes (111) which are formed in the plate (98) and the supporting plate (99) to avoid the interference with them. Each projected end of the pins (108) is rotatably provided with roller (112). As especially shown in FIG. 17, the rollers (112) engage with long holes (114) which are formed in opposite ends of a movable plate (113). This plate (113) and an oblong slider (115) integral therewith are moved in a direction perpendicular to the line passing through the rollers (112) to turn the arms (104) to (107) and the supporting pawls (104a) to (107a) in a direction opposite to the action of the spring (110), thereby releasing the grasp of the paper container (A) by the arms and pawls. On the supporting plate (99), there is secured guides (116) for guiding both sides of the slider (115). The respective guides (116) have grooves (117) to avoid the interference with the movable plate (113). A plate (118) for supporting the slider (115) is secured on the under surface of a pair of guides (116). At a suitable position of the plate (118), a long hole (119) is formed along the moving direction of the slider (115). A pin (120) which is fixed to the slider (115) is protruded downward through the long hole (119) and its projected end is provided with a cam follower (121). Further, a plate (122) disposed at the front ends of the guides (116) and the plate (118) is provided with a stopper bolt (123). By adjusting the projecting length of this stopper bolt (123) toward the slider (115), it is possible to set a position where the slider (115) is stopped in contact with the stopper bolt (123). That is, the position to hold the paper container (A) by the above-mentioned arms (104) to (107), can be adjusted.

Furthermore, a pair of brackets (124) is integrally formed on the back surface of the main body (93). Between these brackets (124), a horizontal pin (125) is attached for permitting the main body (93) to incline around the above-mentioned pin (94). A pair of vertically movable rods (127) is fixed to the rotary disc (81) and to a ring-like rotary plate (126) that is formed integrally under this disc (81) on the rear side of the main body (93) (see FIG. 16). A connecting member (128) is secured to the upper ends of both the rods (127). This connecting member (128) has a horizontal groove (129) in the end face on the side of the main body (93). The above-mentioned pin (125) of the main body (93) engages with this horizontal groove (129). A tension spring (131) is provided through a hole (130) formed in the rotary disc (81) between the connecting member (128) and the rotary plate (126). The spring causes the connecting member (128) to contact with the rotary disc (81) as shown in an imaginary line in FIG. 13. In this condition, the pin (125) engaging with the connecting member (128) is moved down, therefore the main body (93) is turned around the pins (94) which connect it to the rotary disc (81) to bring the slant surface (1) having the opening (2) of the grasped paper container (A) into horizontal state. According to the present invention, if an intersection of a vertical plane (V) between both the slant surfaces (1) of the paper container (A) and an axis (X) vertical to the slant surface (1) and passing through the center of the opening (2) is taken as (Y), it is preferred that the pin (94) of the rotary fulcrum of the main body (93) extends along a horizontal line which passes the vertical plane (V) and the intersection (Y). A supporting plate (132) is fixed between the lower ends of the rods (127), and a cam follower (133) is disposed in the middle of the supporting plate (132).

As will be understood from the foregoing description, the main body (93) of the container retaining mechanism (84) takes a vertical position in the rotating range from the position where the paper container (A) fixed with the faucet (B) approaches the star wheel (89) on the discharge side to the position where a new paper container is fed from the star wheel (19) on the feed side. The arms (104) to (107) and the supporting pawls (104a) to (107a) are in a releasing condition in the same range. For this reason, the cam member (134) in FIG. 12 for setting up the main body (93) by engaging with the cam follower (133) and the cam member (135) for releasing the arms (104) to (107) by engaging with the cam follower (121) are disposed only within the above-mentioned range.

More particularly, when both the cam followers (133) and (121) engage with the cam members (134) and (135), respectively, the main body (93) is inclined by the action of the spring (131), and the arms (104) to (107) and the supporting pawls (104a) to (107a) grasp the paper container (A) by the action of the spring (110). When the paper container retaining mechanism (84) in this condition approaches the star wheel (89) on the discharge side, the cam follower (133) first engages with the cam member (134) and the rod (127) and the connecting member (128) are raised by a predetermined distance against the force of the spring (131). By this action, the pin (125) engaging with the connecting member (128) is caused to rise and thus the main body (93) is turned until it takes a vertical position. An adjusting bolt (136) disposed on the rotary plate (126) is so adjusted that, when the main body (93) takes an accurately vertical position, the bolt (136) comes into contact with the back surface of the integral plate (98).

As the main body (93) takes the vertical position in this way, the cam follower (121) engages with the cam member (135) which is disposed on the locus of the cam follower (121) in this condition, and the slider (115) and the movable plate (113) are moved inward in the radial direction of the rotary disc (81). The grasp to the paper container (A) by means of the arms (104) to (107) and the supporting pawls (104a) to (107a) is released, and each paper container (A) that is applied with the faucet (B) is discharged onto the conveyor (90) by the star wheel (89) on the discharge side. The empty paper container retaining mechanism (84) having no paper container (A) approaches, in this condition, the star wheel (19) on the feed side, and it receives a new paper container (A) from the star wheel (19). As soon as the paper container (A) is led into the paper container retaining mechanism (84), the cam follower (121) is moved outward in the radial direction of the rotary disc (81) by the cam profile of the cam member (135) and the action of the tension spring (110). The arms (104) to (107) and the supporting pawls (104a) to (107a) grasp the paper container (A) with the tension of the spring (110).

When the arms (104) to (107) hold the new paper container (A), the engagement between the cam follower (121) and the cam member (135) is released. When the rotation proceeds, the cam member (134) causes the cam follower (133), the rod (127) and the connecting member (128) to descend, and thereby the main body (93) is inclined to bring the slant surface (1) having the opening (2) of the paper container (A) into horizontal state. After that, the paper container retaining mechanism (84) and the paper container (A) are moved round in the slanting state, until they are made upright in the vicinity of the star wheel (89) on the discharge side.

Further, the faucet retaining mechanism (85) has a hollow movable rod (140) which is vertically movable relative to the two upper rotary discs (82) and (83). As shown in FIG. 18, the movable rod (140) is provided with a bracket (141) which has a cam follower (142). A guide rod (143) shown in FIG. 18 is secured between the two rotary discs (82) and (83) in parallel to the movable rod (140). A pair of parallel projections (144) that are formed on the bracket (141) is brought into frictional contact with the guide rod (143) in order to prevent the bracket (141) from rotating around the movable rod (140). The above-mentioned cam follower (142) engages with a cam groove (146) of a cylindrical cam member (145) that is attached to the stationary shaft (80), between the two rotary discs (82) and (83).

Figures 19, 20:
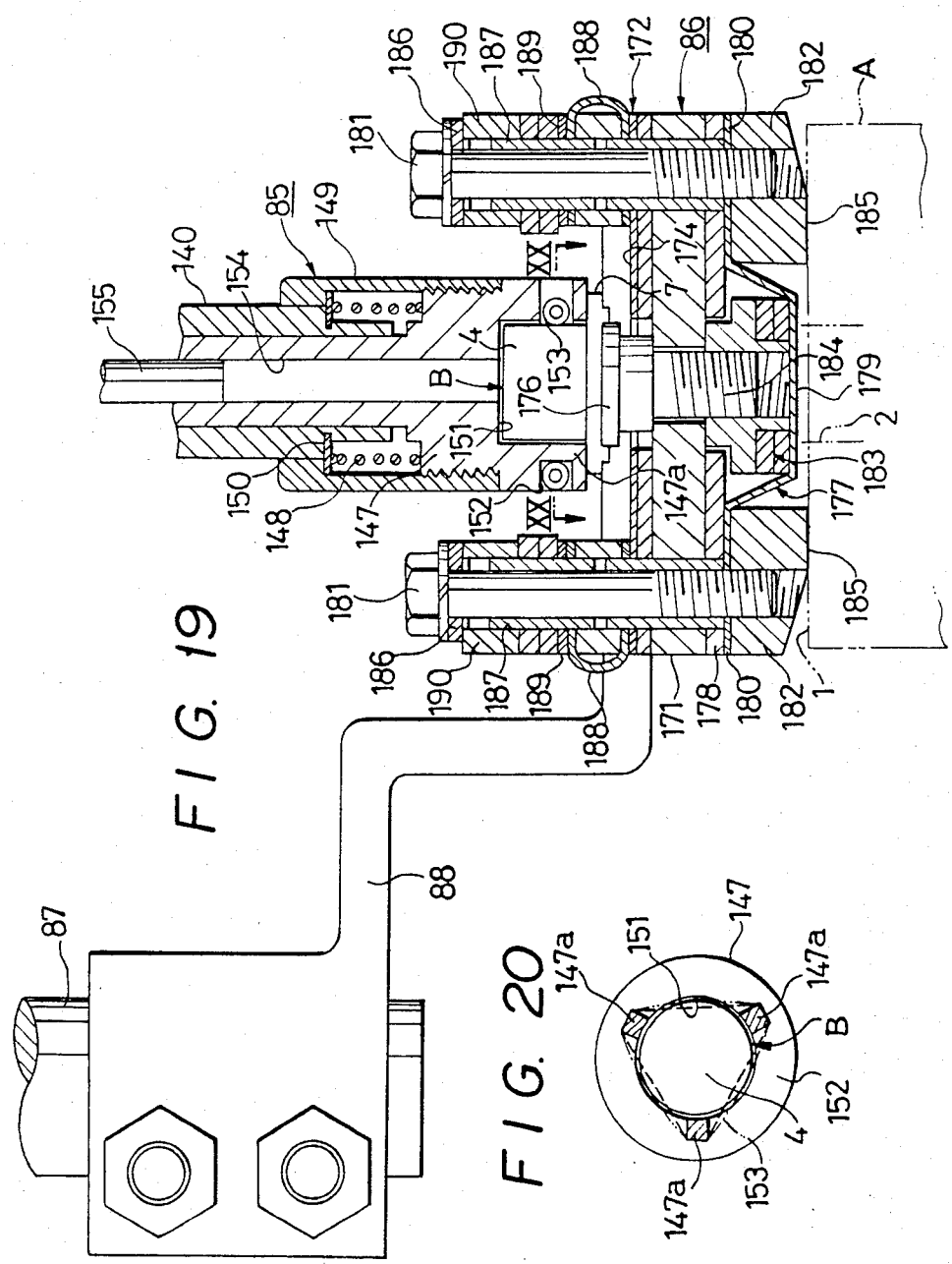
FIG. 19 is an enlarged vertical-sectional view showing the state of heating the paper container and the faucet by means of a heater.
FIG. 20 is a cross-sectional view taken along the line XX—XX of FIG. 19.

As shown in FIG. 19, the faucet retaining mechanism at the lower end of the movable rod (140) has a retaining member (147), the upper portion of which is slidably inserted into the axial bore of the movable rod (140). Between the retaining member (147) and the movable rod (140) is disposed a compression spring (148). The lower end of a cylindrical covering member (149) for covering this spring (148) is screwed to the retaining member (147). The upper end thereof is slidably disposed on the outer periphery of the movable rod (140). The movable rod (140) is provided with a stopper ring (150), by which the downward slipping off can be avoided. The supporting member (147) has a hole (151) in the bottom surface for receiving the cap member (4) of the faucet (B). The hole (151) is provided around the periphery thereof with a ring-like groove (152) connecting to the hole (151) except three coupling portions (147a), as shown in FIG. 20. In the ring-like groove (152), there is provided a coil spring (153) which is made endless by connecting both ends. This coil spring (153) is usually stretched straight between the respective connecting portions (147a), and each straight portion protrudes in the hole (151) (indicated by dash lines in FIG. 20). When the cap member (4) of the faucet (B) is inserted into the hole (151), the coil spring (153) in the hole (151) comes into contact with the peripheral surface of the cap member (4) to retain the faucet (B).

The axial portion of the retaining member (147) is formed with a hollow region (154), and a stationary rod (155) is slidably inserted into the hollow region (154). The upper end of the stationary rod (155) passes through the movable rod (140) and is secured to the rotary plate (156) that is attached to the rotary disc (83) as shown in FIG. 12. The level of the bottom of the stationary rod (155) is so set that when the faucet retaining mechanism (85) takes the highest position between both the star wheels (19) and (89), the stationary rod (155) may project into the hole (151) to push off the faucet (B) if it still remains there.

Although the movable rod (140) of the faucet retaining mechanism (85) moves only vertically, the operating rod (87) for supporting the heater (86) can move vertically and rotate. As shown in FIG. 12, the operating rod (87) is provided with a bracket (161), and the latter is provided with a cam follower (162) in order to make it possible to move vertically. The constitution of this bracket (161) is basically the same as that of the bracket (141) for the movable rod (140). Also in the case of this bracket (161), a free rotation is blocked by a guide rod, and the above-mentioned cam follower (162) engages with a cam member (163). As described above, since the operating rod (87) must be rotatable, it is made rotatable relative to the bracket (161). For this purpose, for example, a ring-like groove around the periphery of the operating rod (87) is formed and a pin or a cam follower disposed on the bracket (161) is engaged with the ring-like groove.

On the top of the operating rod (87), the middle portion of an approximately L-shaped lever (164) is fixed. This lever (164) is provided on an upper end with a cam follower (165) and on the other lower end with a pin (166). Further, a tension spring (168) is disposed between the pin (166) and the other pin (167) which is stood on the upper surface of the rotary disc (83). The cam follower (165) is brought into contact with a cylindrical cam member (169) by the action of the spring (168). This cam member (169) is supported by a stationary frame (170) fixed outside the rotary body (22) and, of course, the cam surface of the cam member (169) is designed taking the vertical movements of the operating rod (87) into consideration.

Figure 21:
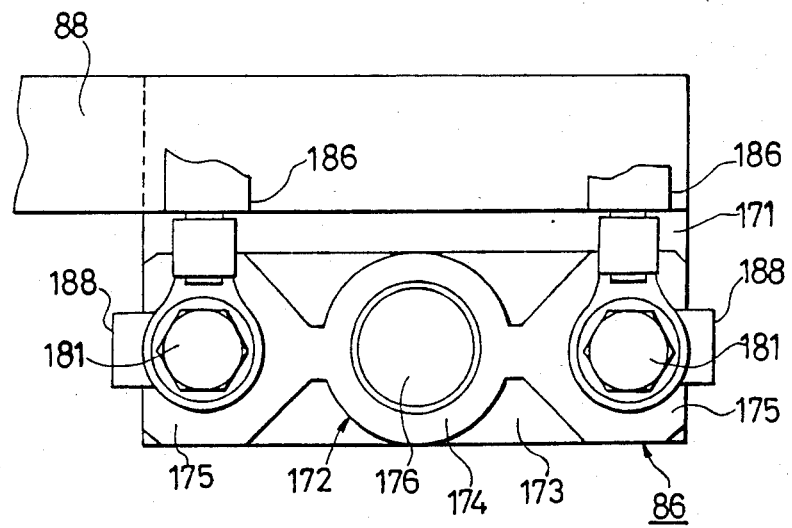
FIG. 21 is a plan view of the heater.

The heater (86) fixed to the lower end of the operating rod (87) by the arm (88) comprises a main body (171) of an oblong insulating material, as will be understood from FIGS. 19 and 21. The tip of the arm (88) is put on one side of the upper face of the main body (171) and they are fixed to each other by bolts, not shown. On the other side of the upper face of the main body (171) is fixed a heating element (172) for heating the faucet (B) and the adhesive portion (7) with interposing an insulating plate (173). The heating element (172) is prepared by punching a flat electrically resistant material into a predetermined shape, and it comprises a ring-like portion (174) and connecting portions (175) on both the sides thereof. The center of the ring-like portion (174) is formed in conformity with the shape of the adhesive portion (7) of the faucet (B). The ring-like portion (174) is provided in the middle portion thereof with a stepped column-like spacer member (176) for making a certain space between the adhesive portion (7) and the heating element (172), with being in contact with the faucet (B).

The bottom surface of the main body (171) is provided with a heating element (177) with interposing therebetween an insulating plate (178) for heating the periphery of the opening (2) formed in the slant surface (1) of the paper container (A). This heating element (177) has in the center thereof a ring or disc portion (179) which is about the same as the above-mentioned ring-like portion (174) in size. Further, it has connecting portions (180) on both sides of the disc portion (179) which projects downward from the connecting portions (180).

A pair of the heating elements (172) and (177) disposed on the upper and lower surfaces of the main body (171) is secured to the main body (171) by pairs of bolts (181) and nuts (182) and the axes of the ring-like portion (174) and the disc member (179) coincide with each other. Between the disc portion (179) of the lower heating element (177) and the main body (171), there is interposed a columnar supporting member (183) which approximately coincides with the peripheral shape of the disc portion. The screw portion of the supporting member (183) is brought into engagement with a screw portion (184) of the space retaining member (176) to simultaneously secure the supporting member (183) and the space retaining member (176) to the main body (171). Further, the nut members (182) are made in the form of a rectangular parallelepiped and the bottom faces of them are contact surfaces (185) for contacting with the slant surface (1) of the paper container (A). A certain space is left between the contact surfaces (185) and the bottom surface of the disc portion (179) of the heating element (177).

The two bolts (181) are utilized as electrical conductor leading to the lower heating element (177), and the latter is connected to a power source by way of both the bolts (181) and conductive lines (186) attached to the upper portions thereof. On the other hand, the upper heating element (172) is insulated from the bolts (181) by means of insulating cylindrical bodies (187) each mounted on the periphery of the bolt (181) and is connected to the power source by the conductors (188) and conductor lines (189). These conductor lines (189) are disposed between a plurality of insulators (190) mounted around the peripheries of the insulating cylindrical bodies (187), thereby being insulated from the conductive lines (186). The conductors (188) electrically connect the conductive lines (189) to the heating element (172). It is natural that each pair of the conductive lines (186) and (189) are connected to the power source by a conventionally known rotary type connecting mechanism so as to avoid twisting by the rotation of the rotator (22). If desired, a passage for cooling water may be formed in the main body (171) or in nuts (182) to cool it.

As described above, the paper container retaining mechanism (84) receives the paper container (A) from the star wheel (19) on the feed side and grasps and inclines it to bring the slant surface (1) into horizontal position. At this phase, the faucet retaining mechanism (85) right above the opening (2) in the slant surface (1), already holds a faucet (B). That is, when approaching the faucet delivering position (P), the faucet retaining mechanism (85) is moved down along the locus of the cam groove (146) of the cam member (145), and at the position (P), the cap member (4) of the faucet (B) on the supporting rest (71) of the faucet forwarding disc (26) is caused to engage with the hole (151) of the supporting member (147), thereby retaining the faucet (B) therein by the coil spring (153) in the supporting member (147). Just before the faucet retaining mechanism (85) grasps the faucet (B), the faucet receiving member (67) for supporting the adhesive portions (7) of the faucet (B) on the supporting rest (71), is moved down by the cam member (74) to release the support of the adhesive portion (7). Therefore, the faucet retaining mechanism (85) smoothly receives the faucet (B) on the supporting rest (71). During this operation, the heater (86) lies at a retreat position which is distant from the axis of the faucet retaining mechanism (85) and inside the rotator (22) (see FIG. 3).

When the paper container (A) is inclined, and the opening (2) and the faucet (B) confront with each other with leaving a predetermined space therebetween, the heater (86) is turned from the retreat position by the rotation of the operating rod (87) and the arm (88) that is caused by the cam member (169), and it is inserted into the space between the opening (2) and the faucet (B). Then, the heater (86) moves down in accordance with the downward movement of the operating rod (87) and the arm (88) by the cam member (163). The contact surface (185) of the nut member (182) is brought into light contact with the slant surface (1) of the paper container (A) as shown in FIG. 19. Thus, the disc portion (179) of the lower heating element (177) approaches the portion of the paper container (A) to be heated, leaving a suitable space therebetween. Simultaneously with the descending of the heater (86), the faucet retaining mechanism (85) is also moved down and it stops in the condition that the faucet (B) is in contact with the space retaining member (176) of the heater (86) which has already been stopped. As a result, the adhesive portion (7) of the faucet (B) also comes face to face with the ring-like portion (174) of the upper heating element (172) with leaving a suitable space therebetween.

The upper and lower heating elements (172) and (177) are connected to the power source always during the operation of the rotator (22), alternatively, they are energized through a detecting switch, not shown, when they are shifted from the retreat position to its operating position. As a result, the paper container (A) and the faucet (B) are heated to their respective optimum temperatures. When both the faucet retaining mechanism (85) and the heater (86) are moved upward, the heater (86) is separated far from the paper container (A) and the faucet (B) and is finally returned to its retreat position, and it waits at this retreat position until a next new paper container is fed. As soon as the heater (86) is retreated, the faucet retaining mechanism (85) is moved down again, and the adhesive portion (7) of the faucet (B) is pressed against a predetermined point of the slant surface (1) of the paper container (A) to cause them to adhere with each other.

Thereafter, the faucet retaining mechanism (85) is moved up again, and the faucet (B) is drawn out of the hole (151) of the retaining member (147) against the action of the coil spring (153) by the adhesive force between the faucet (B) and the paper container (A). The empty faucet retaining mechanism (85) reaches a maximum height between both the star wheels (19) and (89), and it is moved down to hold a new faucet (B). At this highest position, as described above, the stationary rod (155) projects into the hole (151), and if a faucet (B) still remains there owing to the absence of a paper container (A), or owing to no electric current in the heating element (172) or else, the faucet (B) is forced to drop off the hole (151) and the grasp of a next new faucet (B) becomes ready. The paper container (A) in which the attachment of a faucet (B) has been accomplished in this way, is caused to stand and released from the grasp, as mentioned above. It is then discharged onto the conveyor (90) by the star wheel (89) on the discharge side.

The faucet mounting apparatus of the illustrated embodiment is preferably designed for the paper container (A) and the faucet (B) shown in FIG. 1, but may suitably be modified in conformity with other paper containers and faucets to be used. For example, in the case that the cutout (5) of a faucet (B) is omitted, the adjustment of the direction of the faucet (B) is not required, thus the positioning mechanism (24) may be omitted. Further if a paper container has no slant surface (1) and its upper surface is flat, the parts of the paper container retaining mechanism (84), at least the mechanism for inclining, is needless. In such a case, if desired, the arms (104) to (107) and the like may be omitted. On the other hand, even if a paper container (A) has a slant surface (1), the mechanism for inclining it may be omitted. In this case, however, the faucet retaining mechanism (84) must be so disposed on the rotator (22) as to be perpendicular to the slant surface (1) and to move on a line passing the axis of the opening (2). Furthermore, although the heating elements are used in the above-mentioned embodiment, high-frequency heating or ultrasonic heating may be employed in conformity with properties of a resin coating of a paper container and a synthetic resin to form the faucet.

Industrial Applicability

As described above, according to the method and the apparatus of the present invention, it is possible to prepare a paper container which can be opened easily and, after opening, which can be closed easily and tightly.

I claim:

1. An apparatus for affixing a faucet on a container, wherein the faucet and the container have surfaces which can be bonded together by heat welding, comprising: a stationary base; a first, rotary disc mounted on said base for rotation about a vertical axis; a series of container-holding mechanisms mounted in circumferentially spaced positions on said first disc, each of said container-holding mechanisms comprising an upright, main body of substantially U-shaped cross section for holding a container therein, pivot means supporting said main body for pivotal movement about a horizontal axis extending transversely through the upper portion of said main body, and means for effecting pivotal locations of said container-holding mechanisms at selected locations as said first disc is rotated with respect to said base; second and third discs mounted on said base for rotation about said vertical axis and disposed above said first disc, said second disc being disposed directly above said container-holding mechanisms on said first disc, a series of faucet-holding mechanisms mounted on said second and third discs for vertical sliding movement with respect thereto, each of said faucet-holding mechanisms being associated with one of said container-holding mechanisms, said faucet-holding mechanisms being disposed below the lower surface of said second disc and being opposed to the upper ends of said container-holding mechanisms; a series of heaters mounted on said second and third discs for pivotal movement about a vertical axis and for vertical sliding movement, each of said heaters being associated with one of said container-holding mechanisms and one of said faucet-holding mechanisms, each of said heaters comprising a main heater body and first and second heating elements mounted on opposite sides of said main heater body, said first heating element facing downwardly toward its associated container-holding mechanism and being effective for heating a surface of a container held in that container-holding mechanism, said second heating element facing upwardly toward its associated faucet-holding mechanism and being effective for heating a surface of a faucet held in that faucet-holding mechanism; cooperating cam tracks on said base and cam follower means on said container-holding mechanisms, said faucet-holding mechanism and on said heaters so that as said discs rotate in unison with each other with respect to said stationary base, the surfaces of the faucet and the container in each of the work stations will be heated by said first and second heating elements, then said first and second heating elements will be moved out of the way and then the heated surface of the faucet will be pressed against the heated surface of a container whereby to fuse the surfaces together.

2. An apparatus as claimed in claim 1 in which each of said container-holding mechanisms comprises arms pivotally mounted for movement between a first position in which they extend across the open side of said main body for releasably retaining the container therein, and a second position in which they are disposed outside of said main body, and, means responsive to rotation of said first disc for moving said arms between said first and second positions.

3. An apparatus for affixing a faucet on a container, wherein the faucet and the container have surfaces which can be bonded together by heat welding, comprising: a stationary base; a first, rotary disc mounted on said base for rotation about a vertical axis; a series of container-holding mechanisms mounted in circumferentially spaced positions on said first disc, each of said container-holding mechanisms comprising an upright, main body for holding a container therein; second and third discs mounted on said base for rotation about said vertical axis and disposed above said first disc, said second disc being disposed directly above said container-holding mechanisms on said first disc, a series of faucet-holding mechanisms mounted on said second and third discs for vertical sliding movement with respect thereto, each of said faucet-holding mechanisms being associated with one of said container-holding mechanisms, said faucet-holding mechanisms being disposed below the lower surface of said second disc and being opposed to the upper ends of said container-holding mechanisms; a series of heaters mounted on said second and third discs for pivotal movement about a vertical axis and for vertical sliding movement, each of said heaters being associated with one of said container-holding mechanisms and one of said faucet-holding mechanisms, each of said heaters heating comprising a main heater body and first and second, heating elements mounted on opposite sides of said main heater body, said first heating element facing downwardly toward its associated container-holding mechanism and being effective for heating a surface of a container held in that container-holding mechanism, said second heating element facing upwardly toward its associated faucet-holding mechanism and being effective for heating a surface of a faucet held in that faucet-holding mechanism; cooperating cam tracks on said base and cam follower means on said container-holding mechanisms, said faucet-holding mechanisms and said heaters so that as said discs rotate in unison with each other with respect to said stationary base, the surfaces of the faucet and the container in each of the work stations will be heated by said first and second heating elements, then said first and second heating elements will be moved out of the way and then the heated surface of the faucet will be pressed against the heated surface of a container whereby to fuse the surfaces together.

4. An apparatus according to claim 3, in which the container has an inclined surface at the upper end thereof, and including means supporting each of said container-holding mechanisms for movement from an upright position in which the inclined surface of the container is disposed at an angle with respect to the horizontal, to an inclined position wherein the inclined surface of the container is substantially horizontal.

5. An apparatus according to claim 3, including a pair of contact members which project in the same direction away from said first heating element and are adapted to contact the surface of the container on opposite sides of the portion thereof that is to be heated, said contact members projecting outwardly relative to said first heating element so as to maintain a space between said first heating element and the portion of the surface of the container that is to be heated.

6. An apparatus according to claim 3 or claim 14, in which said second heating element comprises a ring-like portion for heating a correspondingly ring-shaped portion of the surface of the faucet, and a retaining member projecting outwardly from the center of said ring-like portion of said second heating element, said retaining member being adapted to contact the surface of the faucet in order to maintain a selected spacing between the ring-like portion of the surface of the faucet and said second heating element.

7. An apparatus according to claim 3 or claim 4, in which the faucets have engaging portions for determining the direction of the faucet, and including faucet-feeding means for feeding faucets to the faucet-holding mechanisms, said faucet-feeding means comprising a rotator mechanism for rotating the faucets around their axes, and an engaging pawl for engaging the engaging portions of the faucets so as to stop rotation of the faucets when the engaging portions of the faucets are oriented in a predetermined direction.

* * * * *

UNITED STATES PATENT AND TRADEMARK OFFICE
CERTIFICATE OF CORRECTION

PATENT NO. : 4 507 168
DATED : March 26, 1985
INVENTOR(S) : Yukio Konaka

It is certified that error appears in the above-identified patent and that said Letters Patent is hereby corrected as shown below:

Column 17, lines 26 and 27; change "locations" to
---movement---.

Column 17, line 57; change "mechanism and on" to ---mechanisms and---.

Column 19, line 3; change "or claim 14" to ---or claim 5---.

Signed and Sealed this

Fifteenth Day of October 1985

[SEAL]

Attest:

DONALD J. QUIGG

Attesting Officer

Commissioner of Patents and
Trademarks—Designate